Figure 1:
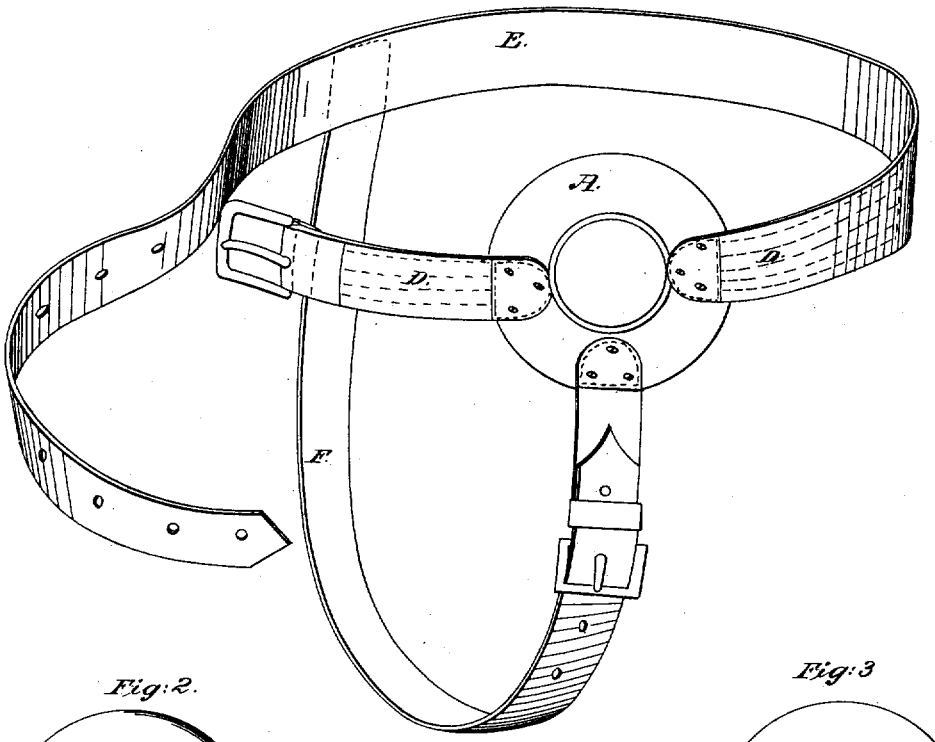
Figure 2:
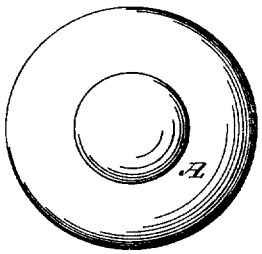
Figure 3:
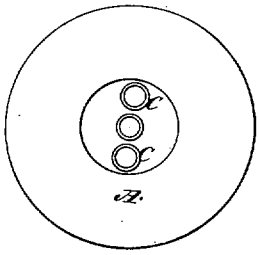
Figure 4:
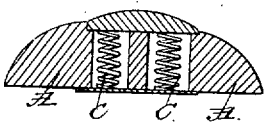

8340X

T. Larrence,

Truss.

Patented Aug. 4, 1834.

AM. PHOTO-LITHO. CO. N.Y. (OSBORNE'S PROCESS.)

8340X Aug. 4. 1834

Thomas Lawrence Clark County Kentucky

Letters Patent

The Schedule referred to in these Letters Patent and making part
of the same containing a description in the words of the said Thomas Lawrence
himself of his improvement in a truss for the cure of hernia or rupture To all to whom these presents shall come. Be it known that I
Thomas Lawrence of the County of Clarke and State of Kentucky
have invented a new truss for the cure of hernia or rupture and that
the following is a full and exact description of the construction and opera-
tion of said truss so invented by me. A small block of wood from
two to five inches in diameter as the size of the Patient may require, is made
round with one side flat and the other oval having a hole in the cen-
tre. thro which a wooden pin with a head on it works by means
of spiral springs. The head of the wooden pin is on the oval side of the
block. and its head must be proportioned to the rupture to which its
is to be applied. The spiral springs are fixed on each side of the pin
going across the top thereof. and fastened in the face of the smooth
surface of said block. The spiral springs are made of coarse wire
and the said block is to be confined to the place intended by springs
fastened on the flat surface to which straps will be fastened - to go
around the body. Said last mentioned springs are three in number
and may be spiral made of wire or they may be made of gum Elas-
tic. one of which is fastened on each side opposite each other. the
other on the lower part so that a strap may be attached thereto, and
brought around so as to prevent the truss from moving upwards from its
position. If the Patient is ruptured on each side a truss for each
rupture is made similar to the above described one. and the two are
fastened together with a spiral spring of the proper length in the
centre. which may be also made of Gum Elastic. or any other sub-
stance having sufficient spring and elasticity and they both

8340X may be confined by a single single strap from each one going around the
body and fastening, and one from the lower part of each one in the manner
before detailed. The part of the block that is oval is to be regulated
by the condition of the patient. If the patient is emaciated and
lean it will have to be much more inclined to flatness, than when the
patient is very fleshy — The cure is performed by said truss
in the following way. the head of the pin fills the orifice and keeps
the bowel up. and after the pin has continued in the orifice a certain
length of time sufficient to have commenced a healing of the ruptur-
ed part. the pressure on the pin is to be lessened gradually so that
the head of it will recede slowly from the orifice and permit it to
heal as the pin is gradually withdrawn great care however must
be taken not to withdraw the pin so suddenly as to let the bowel
down again — Umbilical rupture may be cured by a truss of
the same kind with a small modification. The block need not be
~~made~~ circular but may be made long and round as the rupture
may require. and both sides of it must be flat with a pin through
the centre worked by spiral springs as above, and only one
spring at each side with straps attached thereto to fasten around
the body will be necessary. Given under my hand this 19th
day of July 1834.

Exd Witnesses
W.J.L. James Simpson
John T Kelly

Thomas Lawrence

Drawing (650 Words)